(12) United States Patent
Kim et al.

(10) Patent No.: US 10,425,920 B2
(45) Date of Patent: Sep. 24, 2019

(54) METHOD AND APPARATUS FOR TRANSMITTING AND RECEIVING DATA USING PLURALITY OF CARRIERS IN WIRELESS COMMUNICATION SYSTEM

(71) Applicant: Samsung Electronics Co., Ltd., Gyeonggi-do (KR)

(72) Inventors: Soeng Hun Kim, Gyeonggi-do (KR); Boon Loong Ng, Richardson, TX (US); Gert Jan Van Lieshout, Middlesex (GB); Kyeong In Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/399,888

(22) PCT Filed: May 7, 2013

(86) PCT No.: PCT/KR2013/003950
§ 371 (c)(1),
(2) Date: Nov. 7, 2014

(87) PCT Pub. No.: WO2013/168960
PCT Pub. Date: Nov. 14, 2013

(65) Prior Publication Data
US 2015/0103771 A1 Apr. 16, 2015

(30) Foreign Application Priority Data
May 7, 2012 (KR) .................. 10-2012-0048133

(51) Int. Cl.
*G01R 31/08* (2006.01)
*H04W 72/04* (2009.01)
(Continued)

(52) U.S. Cl.
CPC ... *H04W 72/0413* (2013.01); *H04W 56/0005* (2013.01); *H04W 56/0045* (2013.01);
(Continued)

(58) Field of Classification Search
USPC ................. 370/329, 280, 338, 241, 281, 311
See application file for complete search history.

(56) References Cited

U.S. PATENT DOCUMENTS 8,861,451 B2 * 10/2014 Tenny ................... H04L 5/0098
370/329
8,934,438 B2 * 1/2015 Dinan ................... H04W 56/00
370/329
(Continued)

FOREIGN PATENT DOCUMENTS

WO  WO 2011/100673 A1  8/2011
WO  WO 2011/129601 A2  10/2011
WO  WO 2012/146305 A1 * 11/2012  ............ H04W 72/04

OTHER PUBLICATIONS

International Search Report dated Sep. 4, 2013 in connection with International Patent Application No. PCT/KR2012/003950, 5 pages.
(Continued)

*Primary Examiner* — Phuongchau Ba Nguyen

(57) ABSTRACT

The present invention relates to a method and apparatus for transmitting and receiving data using a plurality of carriers in a wireless communication system. The method includes the steps of: receiving secondary serving cell (SCell) setting information for setting an SCell from a base station; determining whether the secondary SCell belongs to a primary set or to a non-primary set; and, according to a results of the determination, setting forward and reverse initial states as an active or inactive state.

12 Claims, 13 Drawing Sheets

(51) Int. Cl.
*H04W 56/00* (2009.01)
*H04L 5/00* (2006.01)
*H04W 74/08* (2009.01)

(52) U.S. Cl.
CPC ............ *H04L 5/001* (2013.01); *H04L 5/0035* (2013.01); *H04L 5/0094* (2013.01); *H04W 74/0833* (2013.01)

(56) References Cited

U.S. PATENT DOCUMENTS

| | | | | |
|---|---|---|---|---|
| 9,131,363 | B2* | 9/2015 | Vujcic | H04B 7/15507 |
| 9,386,579 | B2* | 7/2016 | Lee | H04W 56/0045 |
| 2009/0201798 | A1* | 8/2009 | Lee | H04W 74/002 |
| | | | | 370/216 |
| 2011/0134774 | A1* | 6/2011 | Pelletier | H04W 52/365 |
| | | | | 370/252 |
| 2012/0063324 | A1* | 3/2012 | Kim | H04L 5/0007 |
| | | | | 370/241 |
| 2012/0106510 | A1* | 5/2012 | Kuo | H04W 76/064 |
| | | | | 370/331 |
| 2013/0034087 | A1* | 2/2013 | Kwon | H04W 56/0005 |
| | | | | 370/336 |
| 2013/0044668 | A1* | 2/2013 | Purnadi | H04W 36/0055 |
| | | | | 370/312 |
| 2013/0272235 | A1* | 10/2013 | Tseng | H04W 56/0005 |
| | | | | 370/329 |
| 2015/0103771 | A1* | 4/2015 | Kim | H04J 11/00 |
| | | | | 370/329 |
| 2015/0117287 | A1* | 4/2015 | Kim | H04W 52/0216 |
| | | | | 370/311 |
| 2015/0373559 | A1* | 12/2015 | Hong | H04W 16/32 |
| | | | | 370/329 |
| 2016/0044735 | A1* | 2/2016 | Ohta | H04W 76/025 |
| | | | | 455/422.1 |

OTHER PUBLICATIONS

Written Opinion of International Searching Authority dated Sep. 4, 2013 in connection with International Patent Application No. PCT/KR2012/003950, 4 pages.
Itri, "Separation of SCell DL Activation and UL Activation State" 3GPP TSG-RAN WG2 Meeting #75, R2-114210, Athens, Greece, Aug. 22-26, 2011, 3 pages.
Extended European Search Report issued for EP 13788636.2 dated Nov. 27, 2015, 8 pgs.
ZTE Advanced, 3rd Generation Partnership Project; Technical Specification Group Radio Access Network; Evolved Universal Terrestrial Radilo Access (EUTRA); Medium Access Control (MAC) Protocol Specification (Release 10), 3GPP Standard, 3GPP TS 36.321 V10.5.0, Mar. 15, 2012, 54 pgs.
NTT DOCOMO, "Views on TM9 and CA Based Approaches for Rel-11 CoMP", 3GPP TSG RAN WG1 Meeting #68, dated Jan. 31, 2012, 6 pgs.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.5.0 (Mar. 2012), 54 pages.
Ericsson et al., "Summary of the email discussion [68#23] LTE: CC activation/deactivation", 3GPP TSG-RAN WG2 #68bis, Jan. 18-22, 2010, 17 pages, Tdoc R2-100079.
Office Action dated Jan. 28, 2019 in connection with Korean Patent Application No. 10-2012-0048133, 8 pages.

* cited by examiner

METHOD AND APPARATUS FOR TRANSMITTING AND RECEIVING DATA USING PLURALITY OF CARRIERS IN WIRELESS COMMUNICATION SYSTEM

CROSS-REFERENCE TO RELATED APPLICATION(S)

The present application claims priority under 35 U.S.C. § 365 to International Patent Application No. PCT/KR2013/003950 filed May 7, 2013, entitled "METHOD AND APPARATUS FOR TRANSMITTING AND RECEIVING DATA USING PLURALITY OF CARRIERS IN WIRELESS COMMUNICATION SYSTEM", International Patent Application No. PCT/KR2013/003950 claims priority under 35 U.S.C. § 365 and/or 35 U.S.C. § 119 (a) to Korean Patent Application No. 10-2012-0048133 filed May 7, 2012, and which are incorporated herein by reference into the present disclosure as if fully set forth herein.

TECHNICAL FIELD

The present invention relates to a data multicarrier-based data communication method and apparatus for use in a mobile communication system.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the 3rd Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Currently, the LTE-A is featured with the intra-eNB carrier aggregation only. This restricts applicability of the carrier aggregation function so as to a problem of failing aggregation of macro and pico cells in a scenario where a plurality of pico cells and a macro cell operate in an overlapped manner.

DISCLOSURE OF INVENTION

Technical Problem

The present invention has been conceived to solve the above problem and aims to provide an inter-eNB carrier aggregation method and apparatus.

Solution to Problem

In accordance with an aspect of the present invention, a serving cell state configuration method of a terminal in a mobile communication system includes receiving a secondary serving cell configuration information for configuring a secondary serving cell from a base station, determining whether the secondary serving cell belongs to a primary set or a non-primary set, and setting downlink and uplink initial states of the serving cell to active or inactive state depending on the determination result.

In accordance with another aspect of the present invention, a terminal which configures serving cell state in a mobile communication system includes a transceiver which transmits and receives to and from a base station and a controller which controls the transceiver to receive a secondary serving cell configuration information for configuring a secondary serving cell from a base station, determines whether the secondary serving cell belongs to a primary set or a non-primary set, and sets downlink and uplink initial states of the serving cell to active or inactive state depending on the determination result.

Advantageous Effects of Invention

The present invention is advantageous in terms of facilitating high speed data communication of a terminal through inter-eNB carrier aggregation.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail. Prior to the description of the present invention, the LTE system and the carrier aggregation are explained briefly.

Figure 1:
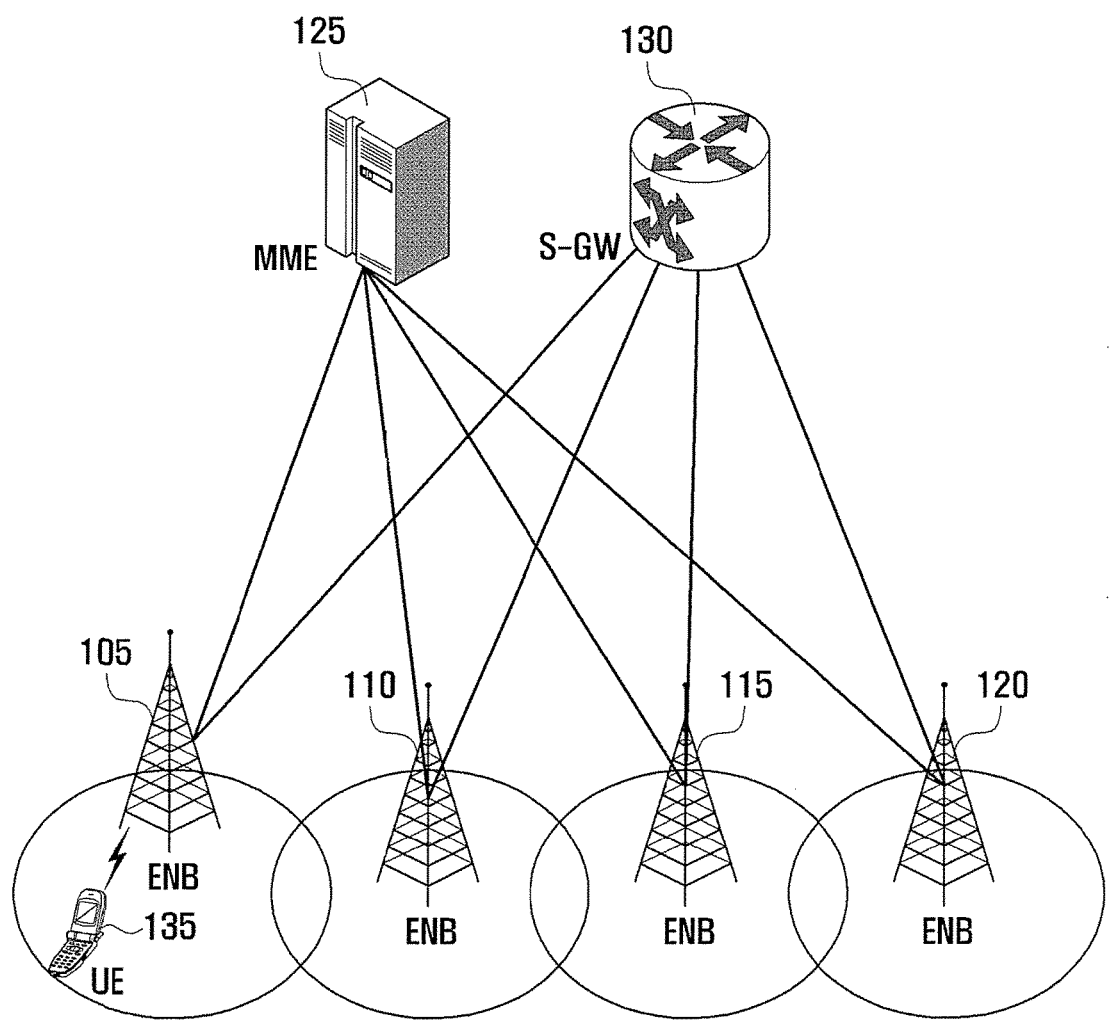
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services such as Voice over IP (VoIP) are provided through a shared channel and thus there is a need of a device to schedule data based on the state information such as buffer states, power headroom states, and channel states of the UEs; and the eNBs 110, 115, and 120 are responsible for this. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
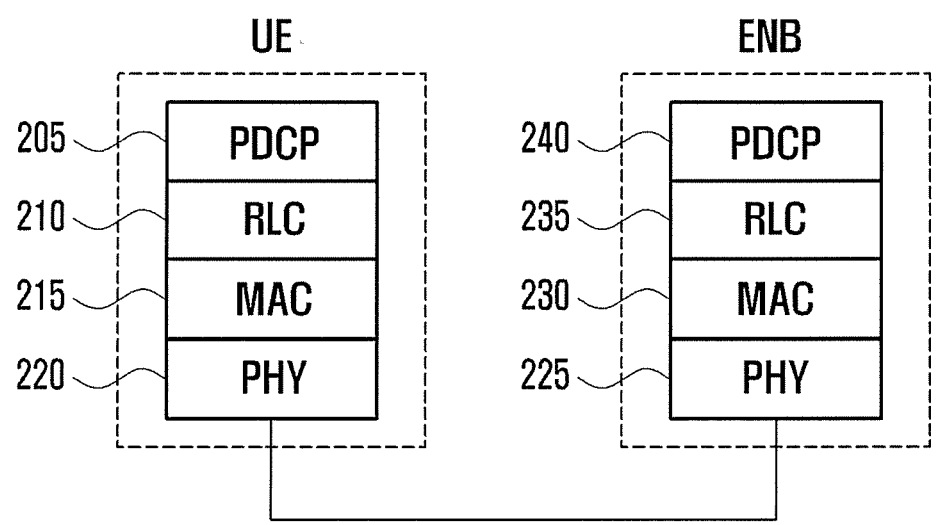
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
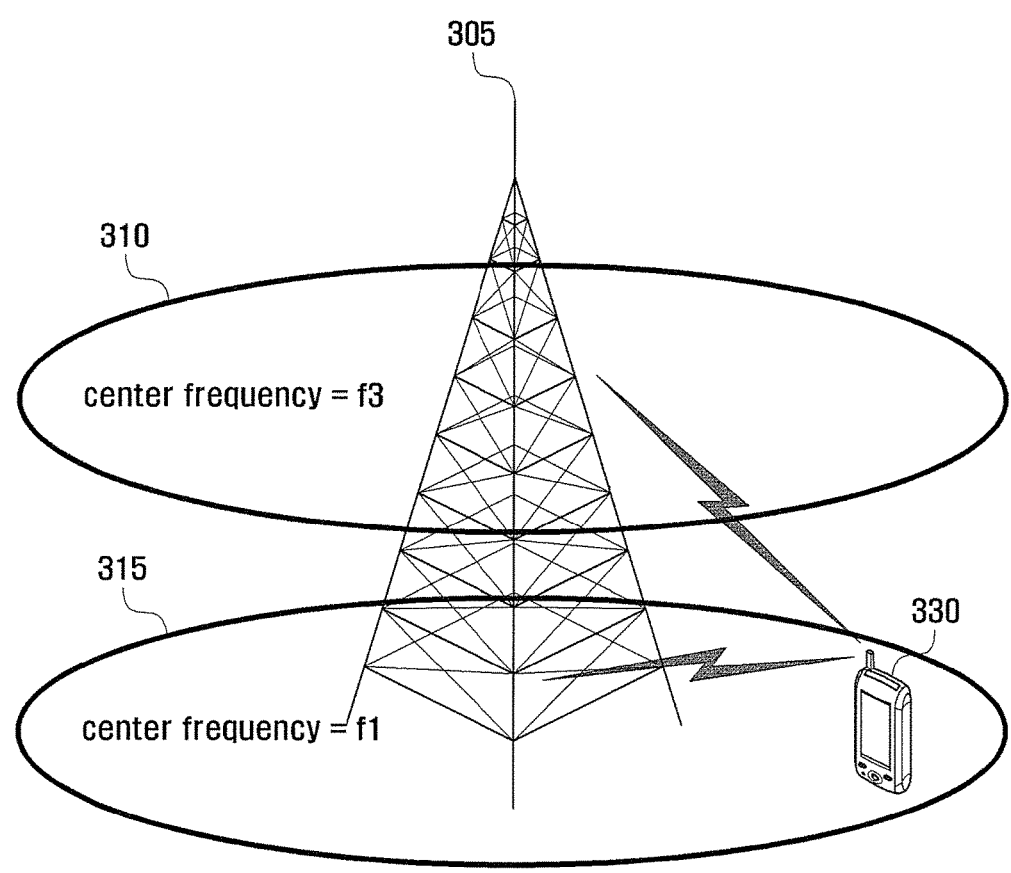
FIG. 3 is a diagram illustrating the concept of typical intra-eNB carrier aggregation.

FIG. 3 is a diagram illustrating the concept of typical intra-eNB carrier aggregation.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. The technique of aggregating the downlink and uplink carriers respectively for transmission and reception at one eNB is referred to as intra-eNB carrier aggregation. In any case, however, there may be a need of aggregating the downlink/uplink carriers of different eNBs.

Figure 4:
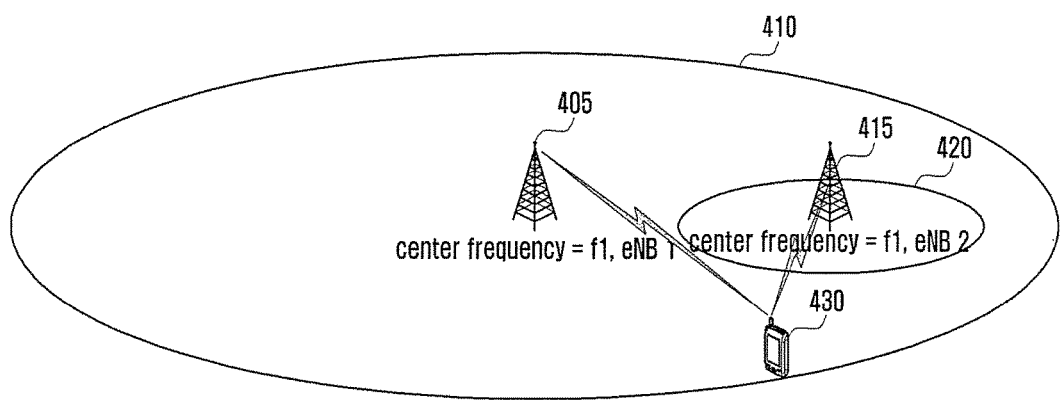
FIG. 4 is a diagram illustrating the concept of inter-eNB carrier aggregation.

Referring to FIG. 4, the eNB 1 405 uses the carrier with center frequency f1 for transmission/reception, and the eNB 2 420 uses the carrier with center frequency f2 for transmission/reception. If the downlink carrier with the center frequency f1 and the downlink carrier with the center frequency f2 are aggregated, this means that carriers transmitted by more than one eNB are aggregated for one UE. This is referred to as inter-eNB Carrier Aggregation (CA) in the present invention.

The terms to be used frequently in the present invention are described hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers. In the present Invention, carrier aggregation may be expressed as configuring a plurality of serving cells with the use of terms such as primary cell (PCell), secondary cell (SCell), and activated serving cell. These terms are used as they are in the LTE mobile communication system and specified in TS36.331 and TS36.321 (December, 2011).

In the present invention, the terms 'primary set' and 'non-primary set.' The primary set is a set of serving cells controlled by the eNB controlling the PCell (primary eNB), and the non-primary set is a set of serving cells controlled by the eNB not controlling the PCell. The eNB notifies the UE whether a serving cell belongs to the primary set or non-primary set in the process of configuring the corresponding serving cell. One UE can be configured with one primary set and one or more non-primary sets.

Figure 5:
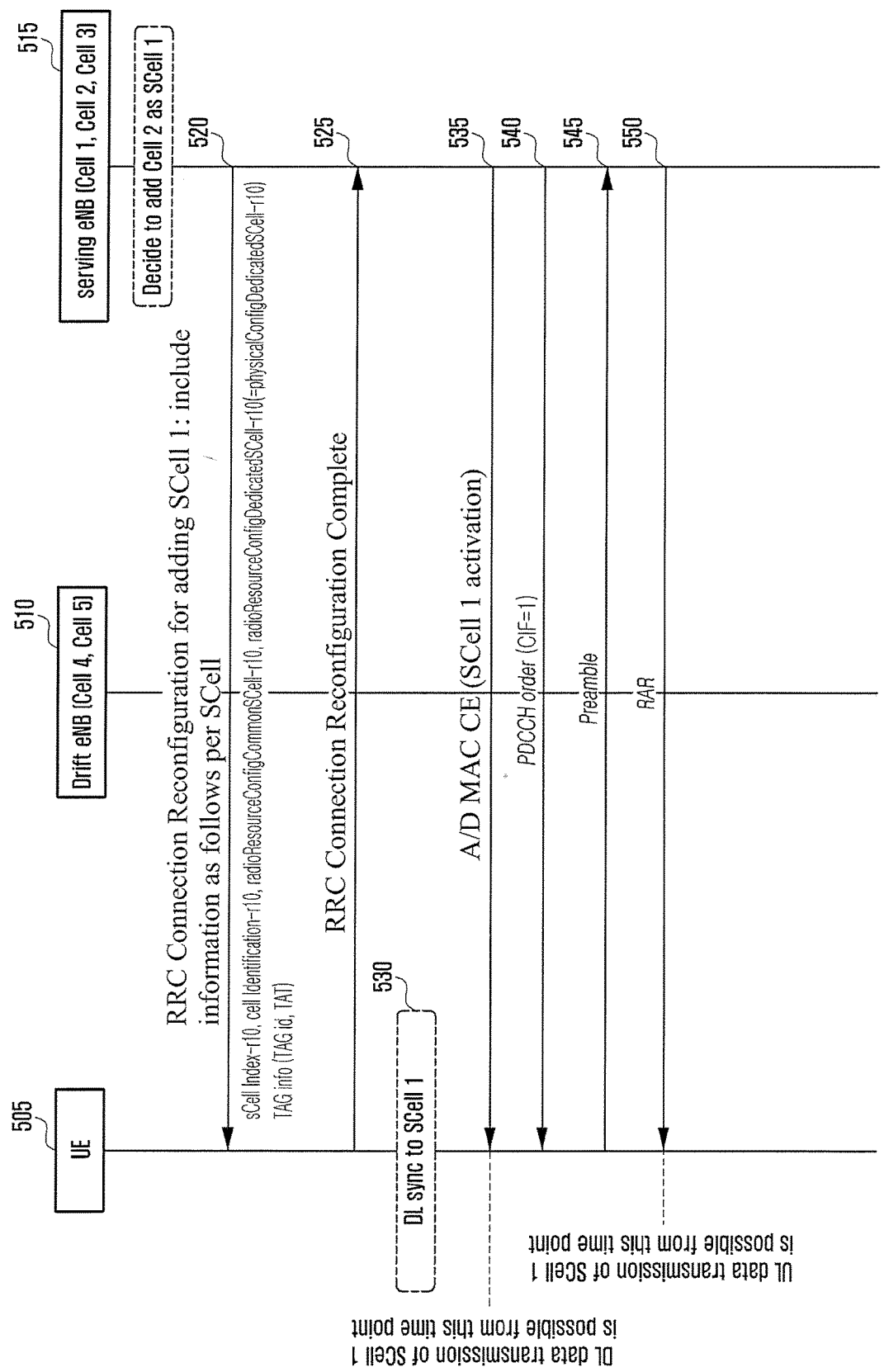
FIG. 5 is a signal flow diagram illustrating the operations of the UE and the eNB for configuring a SCell belonging to the primary set.

FIG. 5 is a signal flow diagram illustrating the operations of the UE and the eNB for configuring a SCell belonging to the primary set.

In the mobile communication system made up of a UE 505, eNB 1 515, and eNB 2 510; the first, second, and third cells are controlled by the eNB 1, and the fourth and fifth cells are control by the eNB 2. Suppose that the PCell of the UE is the cell 1 and the eNB 1 configures the cell 2 as an additional SCell to the UE 505. In the following description, the eNB controlling the PCell, i.e. controlling the primary set, is referred to as the serving eNB. The eNB which is not the serving eNB of the UE and controls the serving cell of the UE is referred to as the drift eNB.

The serving eNB 515 sends the UE a control message called RRC Connection Reconfiguration including the information on the SCell to be added newly to the UE at step 520. The control message includes the information as follows per serving cell.

TABLE 1

| Name | Description |
|---|---|
| sCellIndex-r10 | Serving cell identifier of an integer with a predetermined size. Used in updating information on the corresponding serving cell in the future. |

TABLE 1-continued

| Name | Description |
| --- | --- |
| cellIdentification-r10 | Information for use in identifying the serving cell physically and composed of downlink center frequency and Physical Cell ID (PCI) |
| radioResourceConfig CommonSCell-r10 | Information on radio resource of service cell, e.g. downlink bandwidth, downlink Hybrid ARQ (HARQ) feedback channel configuration information, uplink center frequency information uplink bandwidth information. |
| radioResourceConfig DedicatedSCell-r10 | Information on UE-specific resource allocated in the serving cell, e.g. channel quality measurement reference signal structure information and inter-carrier scheduling configuration information. |
| TAG(Timing Advance Group) information | Information indicating TAG to which UE belongs. For example, it may be composed of TAG id and Timing Advance (TA) timer. If the UE belongs to P-TAG, this information may not be signaled. |

The TAG can be explained a set of the serving cells sharing the same uplink transmission timing. A TAG is classified into one of Primary TAG (P-TAG) and Secondary TAG (S-TAG): the P-TAG is of including the PCell and the S-TAG is of including only SCells with the exception of PCell. If a certain serving cell belongs to a certain TAG, this means that the uplink transmission timing of the serving cell is identical with those of the other serving cells belonging to the TAG and whether the uplink synchronization is acquired is determined by means of the TA timer of the TAG. The uplink transmission timing of a certain TAG is set through a random access process in a serving cell belonging to the TAG and maintained with the receipt of TA command. The UE starts or restart the TA timer of the corresponding TAG whenever the TA command for the corresponding TAG is received. If the TA timer expires, the UE determines that the uplink transmission synchronization of the corresponding TAG has broken and thus suspends uplink transmission until the next random access occurs.

The UE 505 transmits a response message in reply to the control message at step 525 and establishes downlink synchronization with the cell2 at step 530. If the downlink synchronization is established in a certain cell, this means that the synchronization channel of the cell is acquired so as to check the downlink frame boundary. The serving eNB sends the UE 505 the Activate/Deactivate MAC Control Element (A/D MAC CE) as a MAC layer control command instructing the UE at step 535 to activate the SCell 1 at a time when it is determined that the UE has completed configuration of SCell 1. The control command is structured in the form of a bitmap of which the first bit corresponds to the SCell 1, the second bit to SCell 2, and the $n^{th}$ bit to SCell n. Each bit indicates activation/deactivation of the corresponding SCell.

The UE starts monitoring the physical control channel (carrying Physical Downlink Control Channel (PDCCH) and uplink/downlink transmission resource allocation information) of the SCell after the elapse of a predetermined period from the receipt of the SCell 1 activation command at step 535. If the SCell has been acquired synchronization and belonged to a TAG already, the downlink/uplink transmission starts since then. That is, if the downlink transmission resource allocation information is received on the PDCCH, the UE receives downlink data but ignores the uplink transmission resource information although it has been received. If the SCell belongs to a non-synchronized TAG, the UE waits for the receipt of 'random access command' on PDCCH in a SCell belonging to the TAG. The random access command is a value of a predetermined field of the uplink transmission resource allocation information to instruct the UE to transmit a preamble in a serving cell. The Carrier Indicator Field of the random access command may carry the identifier of the serving cell for preamble transmission. The UE receives a random access command instructing to transmit the random access preamble in the serving cell 1 at step 540. The UE monitors PDCCH of the PCell to receive Random Access Response (RAR) in reply to the preamble after transmitting the preamble through the SCell 1 at step 545. The RAR may include TA command and other control information. If the preamble is transmitted by the serving eNB, it is likely to be efficient to send the response in replay to the preamble through the PCell in various aspects. For example, since the RAR is received only through the PCell, it is possible to reduce the PDCCH monitoring load of the UE. Accordingly, the UE monitors the PDCCH of the PCell to receiving RAR at step 550. If a valid response message is received in reply to the preamble, the UE assumes that it is possible to transmit uplink signal transmission after the elapse of a predetermined period from that time point. For example, if the valid RAR is received at the subframe n, it is determined that the uplink transmission is possible from the subframe (n+m).

Figure 6:
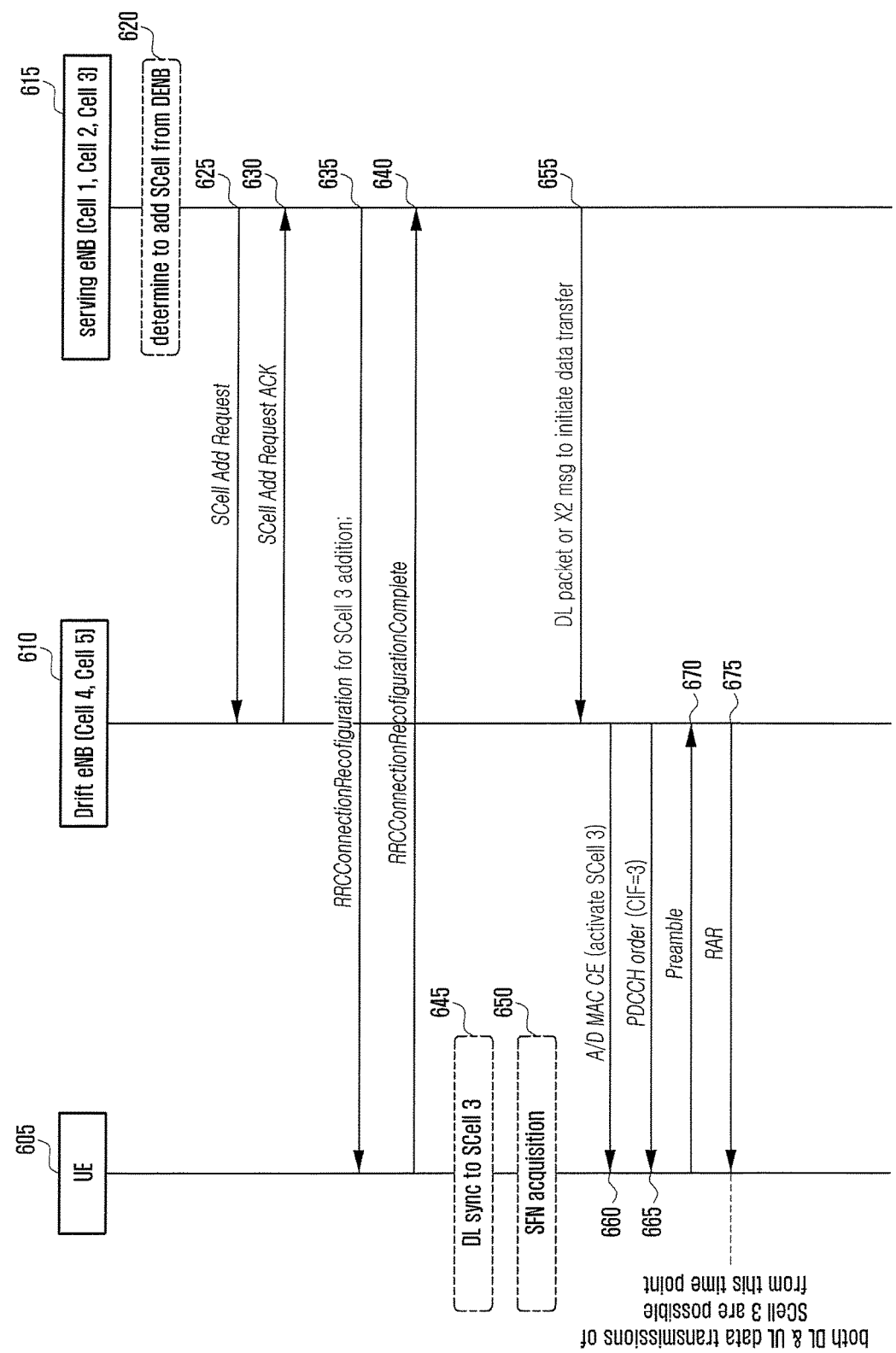
FIG. 6 is a signal flow diagram illustrating operations of UE and eNB for configuring a SCell belonging to a non-primary set.

FIG. 6 is a signal flow diagram illustrating operations of UE and eNB for configuring a SCell belonging to a non-primary set.

The serving eNB 615 determines to add a SCell to the UE 605 at a certain time point. Particularly if the UE is located in the area of a cell controlled by the eNB 2 610, the serving eNB determines to add the cell controlled by the eNB 2 as a SCell and sends the second eNB 2 a control message at step 625. The control message includes the information as follows.

TABLE 2

| Name | Description |
| --- | --- |
| SCell id info. | Information related to the identifiers of SCells to be configured by the drift eNB. Formed with one or more sCellIndex-r10. Determined by the serving cell and notified to the drift eNB to prevent the identifier in use by the serving eNB from being reused. |

TABLE 2-continued

| Name | Description |
| --- | --- |
| TAG id info. | Information related to identifier of TAG to be configured by the drift eNB. Defined by the serving eNB and notified to the drift eNB to prevent the identifier in used by the serving eNB from being reused. |
| UL scheduling info. | Include priority informations of logical channels and logical channel group information configured to the UE. The drift information interprets the UE buffer state report information and performs uplink scheduling using this information. |
| Data rate info. | Information on predicted DL/UL data rate of UE. The drift eNB determines whether to accept or reject adding of the SCell based on this information. |

If the SCell Add Request control message is received, the drift eNB determines whether to accept the request in consideration of the current load status. If it is determined to accept the request, the drift eNB sends the serving eNB a control message including the information as follows at step 630.

TABLE 3

| Name | Description |
| --- | --- |
| SCellToAddMod | Information related to SCells configured by the drift eNB as follows. sCellIndex-r10, cellIdentification-r10, radioResourceConfigCommonSCell-r10, radioResourceConfigDedicatedSCell-r10, TAG-related information |
| PUCCH information for PUCCH SCell | At least one of SCells belonging to the non-primary set is configured with Physical Uplink Control Channel (PUCCH). Uplink control information such as HARQ feedback, Channel Status Information (CSI), Sounding Reference Signal (SRS), and Scheduling Request (SR) is transmitted. Hereinafter, the SCell in which PUCCH is transmitted is referred to as PUCCH SCell. The PUCCH SCell identifier and PUCCH configuration information are the sub-informations of this information. |
| Information for data forwarding | Information on Logical channel (or logical tunnel) for use in data exchange between the serving eNB and drift eNB: including GPRS Tunnel Protocol (GTP) tunnel identifier for downlink data exchange and GTP tunnel identifier for uplink data exchange. |
| UE identifier | C-RNTI to be used by UE in SCells of non-primary set. |

If the control message is received, the serving eNB generates an RRC control message instructing the UE to add a serving cell at step 635. The RRC control message may include the information as follows.

TABLE 4

| Name | Description |
| --- | --- |
| SCellAddMod | This includes the information transmitted by the drift eNB without modification. That is, this is identical with SCellAddMod in table 3. This includes SCellAddMod per SCell and is sub-information of SCellAddModList. |
| PUCCH information for PUCCH SCell | This includes the information transmitted by the drift eNB without modification. That is, this is identical with PUCCH information for PUCCH SCell in table 3. |
| Non-primary SCell List | This is the information on the SCells belonging to the non-primary set among the SCells to be configured. This may be the identifiers of the SCells or the TAGs belonging to the non-primary set. |
| UE identifier | C-RNTI to be used by UE in SCells of non-primary set. |

The RRC control message may include the configuration information of a plurality of SCells. The serving cells of the primary and non-primary sets may be configured together. For example, if the cells 2, 3, 4, and 5 are configured to the UE having the cell 1 as its PCell, the informations thereon may be arranged in the RRC control message in various orders as exemplified in FIG. 7. In the example, the cell 1 and Cell 2 have the same uplink transmission timing to form the P-TAG, the Cell 3 forms the S-TAG 1, and the Cell 4 and Cell 5 form the S-TAG 2.

Figure 7:
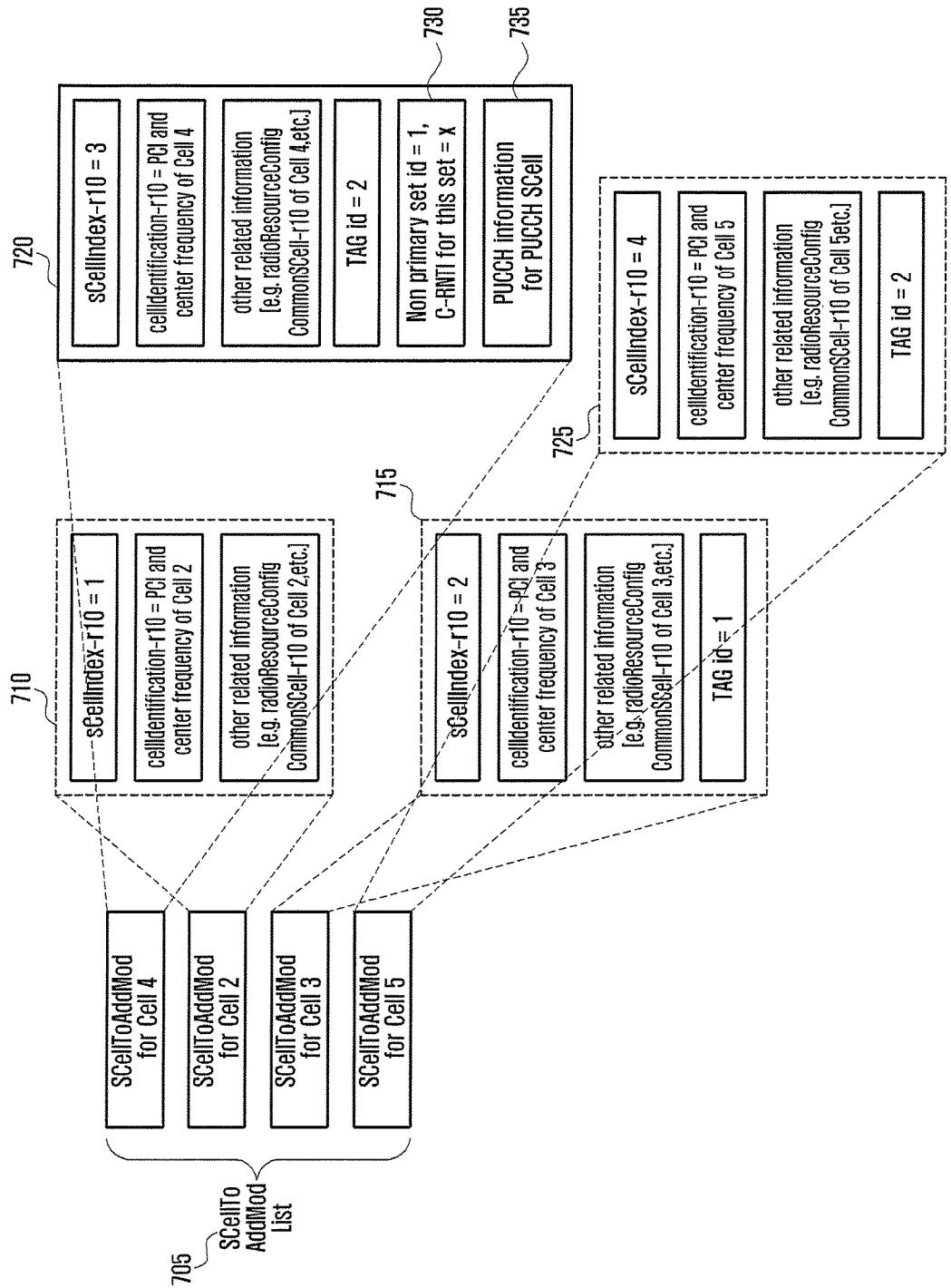
FIG. 7 is a diagram illustrating an exemplary RRC control message including SCell configuration information.

The RRC control message contains SCellToAddModList 705 including SCellToAddMod 710 for Cell 2, SCellToAddMod 715 for Cell 3, SCellToAddMod 720 for Cell 4, and SCellToAddMod 725 for Cell 5. The SCellToAddMod may include specific information or not depending on the characteristic of the corresponding SCell. If the SCell belongs to the P-TAG, i.e. if the SCell has the same uplink transmission timing as the PCell, the corresponding SCellToAddMod does not include the information related to the TAG. For example, the SCellToAddMod for the Cell 2 does not include the information about TAG. The SCellToAddMod for the SCells of the rest non-P-TAGs may include the TAG identifiers and TA timer values of the TAGs to which the corresponding SCells belong. The information on at least one of the cells belonging to the non-primary set may include the non-primary set information 730, e.g. non-primary set identifier and C-RNTI for use by the UE in the non-primary set. In the example of FIG. 7, the SCellToAddMod for the cell 4 includes the non-primary set information 730. The information on one of the cells belonging to the non-primary set includes PUCCH configuration information 735. In the example of FIG. 7, the SCellToAddMod for the cell 4 includes this information. To the SCell which belongs to the non-primary set but has no non-primary set information, the non-primary set information of the SCell having the same TAG id is applied. For example, although the information on the cell 5 includes no non-primary set information, the UE can check that the cell 5 belongs to the non-primary set based on the non-primary set information of the cell 4 which has the same TAG id and use the non-primary set identifier and C-RNTI of the cell 4 for identifying the cell 5.

Figure 8:
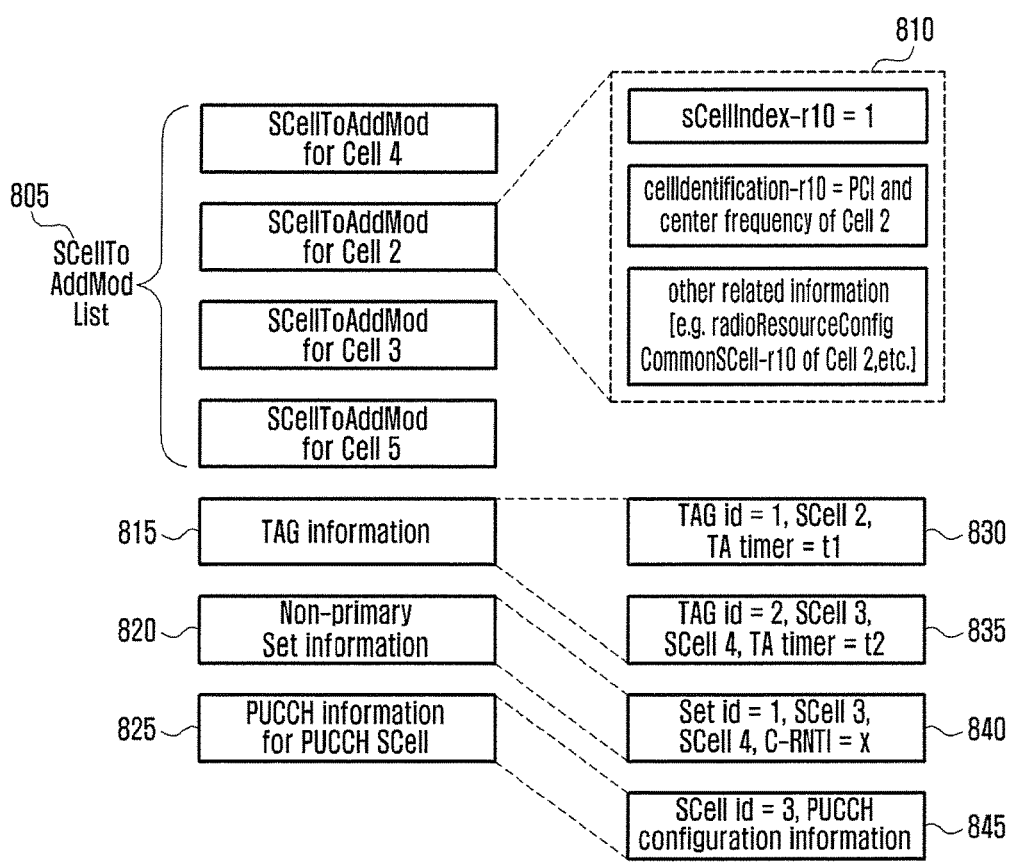
FIG. 8 is a diagram illustrating another exemplary RRC control message including SCell configuration information.

FIG. 8 shows another example of arranging the TAG-related information and the non-primary set-related information in separate regions other than SCellToAddMod.

The RRC control message includes SCellToAddModList containing SCellToAddMod 810 for cell 2, SCellToAddMod for cell 3, SCellToAddMod for cell 4, and SCellToAddMod for cell 5. The SCellToAddMod may include the same type of informations. That is, every SCellToAddMod includes the information such as sCellIndex-r10, cellIdentification-r10, and radioResourceConfigCommonSCell-r10.

The TAG information 815, the non-primary set information 820, and the PUCCH configuration information of PUCCH SCell 825 may be included separately. The TAG information 815 includes the TAG identifiers, identifiers of the SCells forming the TAG, and TA timer value. For example, the TAG information 815 includes the information 830 indicating that the TAG having the TAG identifier 1 includes the SCell 2 and that the TA timer is set to the value t1 and the information 835 indicating that the TAG having the TAG identifier 2 includes the SCell 3 and SCell 4 and that the TA timer is set to the value t2.

The non-primary set information 820 includes the per-non-primary set identifiers, identifiers of the serving cells included in the set, and C-RNTI for use in the corresponding set. For example, the information 840 indicating that the non-primary set having the set identifier 1 includes the SCell 3 and SCell 4 and uses the C-RNTI x. The primary set information is determined according to the following rule without explicit signaling.

<Primary Set Information Determination Rule>

Serving cell belonging to primary set: PCell and SCells not belonging to any non-primary set C-RNTI to be used in primary set: C-RNTI in use currently in PCell The non-primary set information may include the TAG identifier other than the SCell identifier. This is possible under the assumption that the set and TAG are formed such that one TAG is not formed across multiple sets. For example, the non-primary set configuration information 820 may include the information indicating the TAG id 2 instead of the information indicating the SCell 3 and SCell 4 in order for the UE to determine that the SCell 3 and SCell 4 having the TAG id 2 belong to the non-primary set.

The PUCCH SCell's PUCCH configuration information is made up of non-primary set identifier, PUCCH SCell identifier, and PUCCH configuration information. Each non-primary set has one PUCCH SCell, and the CSI information for the serving cells belonging to the non-primary set and HARQ feedback information may be transmitted on the PUCCH configured to the PUCCH SCell.

The PUCCH SCell can be determined according to a predetermined rule without signaling PUCCH SCell identifier explicitly. For example, the SCell corresponding to the first SCellToAddMod of the SCellToAddModList may be assumed as the PUCCH SCell. Also, the SCell having the highest or lowest SCell identifier among the SCells of which information includes the SCellToAddMod information in the corresponding RRC control message may be determined as the PUCCH SCell. Such an implicit determination method can be used under the assumption that only one non-primary set exists.

The UE sends the serving eNB a response message at step 640 and establishes downlink synchronization with the newly configured SCells at step 645. The UE acquires System Frame Number (SFN) of the PUCCH SCell among the newly configured SCells at step 650. The SFN is acquired in the process of receiving the system information, i.e. Master Information Block (MIB). The SFN is an integer incrementing by 1 at every 10 ms in the range of 0 to 1023. The UE checks the PUCCH transmission timing of the PUCCH SCell based on the SFN and PUCCH configuration information.

Afterward, the UE waits until the SCells are activated. If downlink data or a predetermined control message instructing to activate SCell is received from the serving eNB at step 655, the drift eNB starts a procedure of activating the SCells.

The drift eNB sends the UE the A/D MAC CE instructing to activate the SCell, e.g. SCell 3, and, if the MAC CE is received at the subframe n, the UE activates the SCell at subframe (n+m1). However, since the uplink synchronization of the PUCCH SCell is not acquired yet at the subframe (n+m1), both the downlink and uplink transmission/reception are not possible although the SCell has been activated. That is, the UE monitors PDCCH of the SCell but ignores the downlink/uplink resource allocation signal although it is received. The drift eNB sends the UE a random access command to establish uplink synchronization with the PUCCH SCell at step 665. The UE initiates random access procedure in the PUCCH SCell using a dedicated preamble indicated in the random access command. That is, the UE sends a preamble through the SCell at step 670 and monitors PDCCH to receive RAR in response thereto. If the UE transmits the preamble in the primary set, the RAR is transmitted through the PCell. Otherwise if the preamble is transmitted in the non-primary set, the UE monitors PDCCH of the SCell in which the preamble has been transmitted or the PUCCH SCell to receive RAR. This is because there is a need of extra information exchange between the drift eNB and the serving eNB to process the RAR in the PCell. The RAR may be received with the C-RNTI to be used by the UE in the non-primary set. It is more efficient to transmit the response message with the C-RNTI because the UE also has been allocated the C-RNTI and there is no probability of malfunctioning caused by collision due to the use of the dedicated preamble (i.e. since the eNB knows the UE to which the RAR has to be transmitted based on the dedicated preamble). If the valid response message is received through the SCell in which the preamble has been transmitted or the PUCCH SCell, the UE adjusts the uplink transmission timing of the PUCCH SCell and the TAG to which the PUCCH SCell belongs based on the TA command of the response message and activates uplink at a predetermined time point. If the valid TA command or the valid random access response message is received at the subframe n, the predetermined timing becomes the subframe (n+m2). Here, m2 is a predetermined integer.

Figure 9:
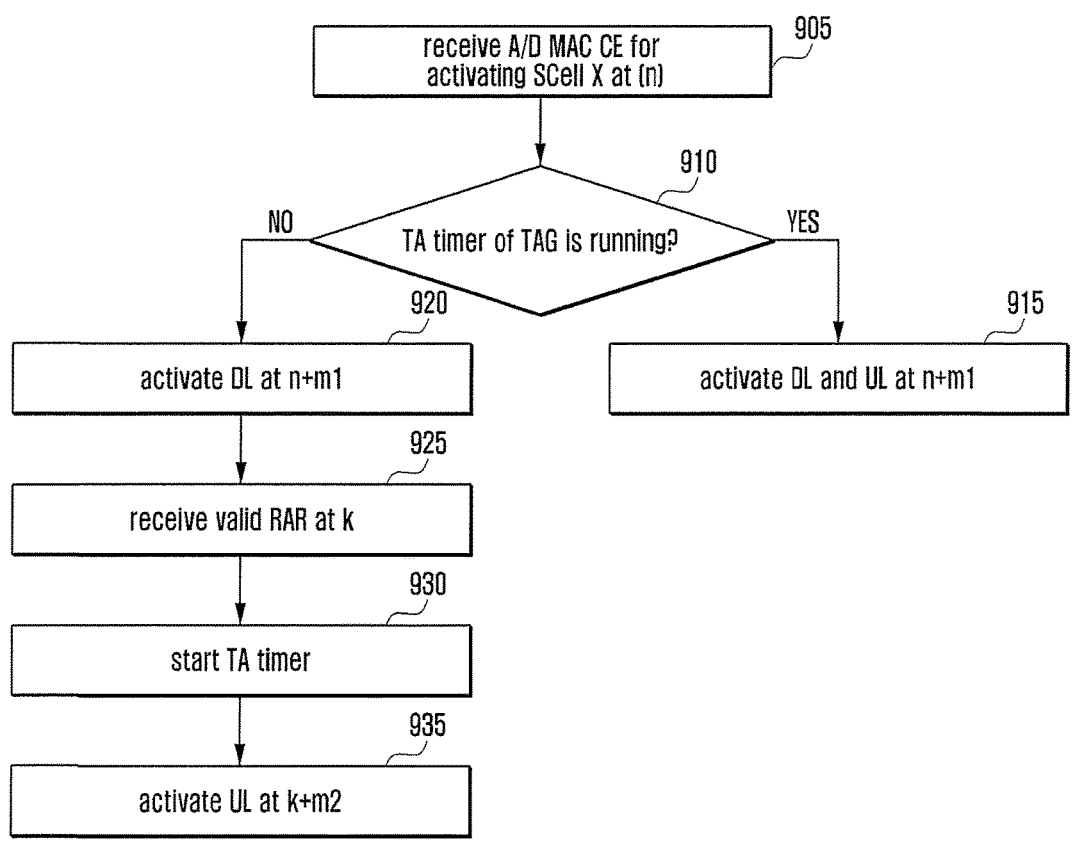
FIG. 9 is a flowchart illustrating the UE operation of activating a certain SCell.

FIG. 9 is a flowchart illustrating the UE operation of activating a certain SCell.

At step 905, the UE receives an A/D MAC CE indicating activation of a certain SCell at subframe (n). The UE determines whether the TA timer of the TAG to which the SCell x belongs is running currently at step 910. If the time is running, this means that the uplink synchronization is maintained and thus the UE activates both the downlink and uplink of the SCell x at the subframe (n+m1) at step 915. Here, m1 denotes a time period given in order for all the types of UEs supporting carrier aggregation to interpret the A/D MAC CE and take a necessary operation and may be fixed to a value as specified in the standard. If the TA timer is not running, this means that uplink synchronization is not established and thus the UE activates only the downlink of the SCell x at the subframe (n+m1) at step 920. Afterward, if a command instructing to perform random access for a certain SCell y of the TAG to which the SCell x belongs from the eNB, the UE sends the SCell y a preamble and waits for receiving a random access response. If a valid random access response is received at step 925, the UE starts the TA timer of the TAG to which the SCell x belongs at step 930 and activates the uplink of the SCell x at the subframe (k+m2) at step 935. The SCell x and the SCell y may be the same cell. Here, m2 denotes a time period given in order for all the types of UEs supporting carrier aggregation to interpret the random access response message and take a necessary action and may be fixed to a value specified in the standard. Although m1 and m2 can be set to the same value, it is more efficient to set them to different values optimized thereto respectively because the necessary operations are likely to be different from each other.

Figure 10:
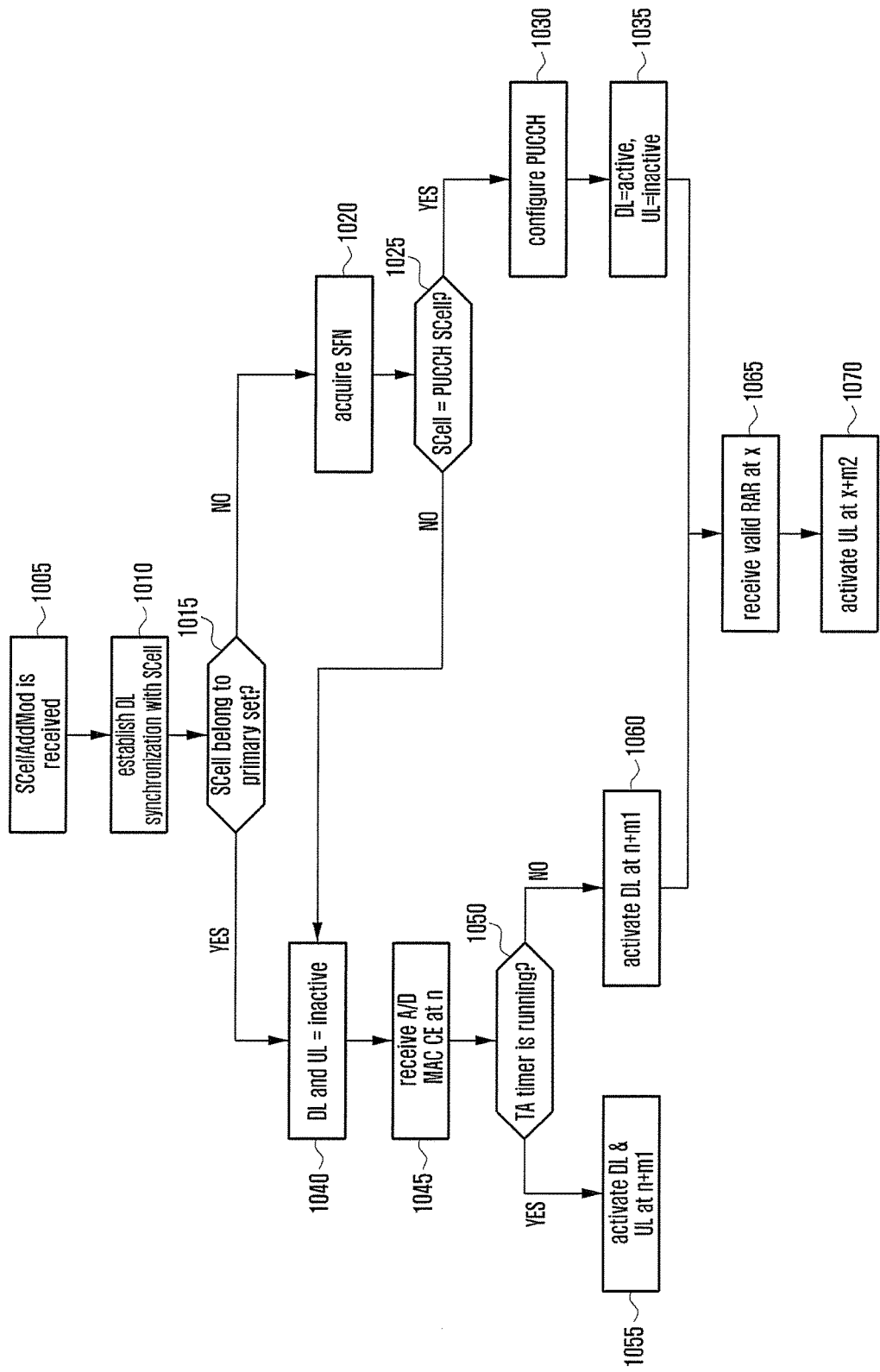
FIG. 10 is a flowchart illustrating the UE operation of configuring and activating n SCell.

Activating the downlink of SCell x has the meanings as follows.
  Monitoring PDCCH of SCell x
  Initiating report of CSI (Channel Status information, i.e. DL channel status and control information for MIMO operation) for SCell x Activating the uplink of SCell which is not PUCCH SCell has the meanings as follows.
  Initiating SRS transmission in SCell x
  UL-SCH (Uplink Shared Channel, i.e. data channel carrying uplink signals) in SCell x Activating the uplink of the PUCCH SCell has the meanings as follows.
  Initiating SRS transmission in SCell x
  UL-SCH (Uplink Shared Channel, i.e. data channel carrying uplink signals) in SCell x
  Initiating transmission of PUCCH (control channel carrying uplink control signal including HARQ feedback, CSI, etc.) in SCell x FIG. 10 is a flowchart illustrating the UE operation of configuring and activating n SCell.

The UE receives SCellToAddMod about a certain SCell at step 1005. The UE establishes downlink synchronization with the SCell at step 1010 and determines whether the SCell belongs to the primary set or a non-primary set at step 1015. If the serving cell belongs to the primary set, the procedure goes to step 1040 and, otherwise if the serving cell belongs to the non-primary set, step 1020. At step 1020, the UE acquires SFN of the corresponding SCell. Since it may take considerable time to acquire SFN, the procedure may progress the next step in the course of acquiring SFN. The SFN acquisition process may be performed only when the corresponding SCell is the PUCCH SCell. The UE determines whether the corresponding SCell is the PUCCH SCell at step 1025. If the SCell is the PUCCH SCell, the procedure goes to step 1030 and, otherwise, step 1040. The UE configures PUCCH to the corresponding SCell at step 1030 and sets the initial state of the corresponding SCell, i.e. downlink to active state and uplink to inactive state, at step 1035. Although it is typical to set the initial states of all the SCells to inactive state, if the initial state of the PUCCH SCell is set to inactive state, it is necessary to transmit the A/D MAC CE to the UE to activate the PUCCH SCell. Particularly if the A/D MAC CE is transmitted by the drift eNB, this causes a problem in that it is impossible to transmit HARQ feedback corresponding to the A/D MAC CE because no uplink synchronization is established with the PUCCH SCell. In order to solve this problem, it is defined to set the initial state of the PUCCH SCell to active state. The eNB commands the UE to transmit a random access preamble in the PUCCH SCell to establish uplink synchronization with the PUCCH SCell. After transmitting the preamble, the UE waits until a response message, e.g. random access response message, in reply to the preamble. If a valid random access response message is received at step 1065, the UE activates the uplink at a predetermined timing, e.g. subframe (x+m2) at step 1070. If the SCell is not the PUCCH SCell of the non-primary set at step 1025, the UE sets the initial state of both the downlink and uplink of the SCell to inactive state at step 1040. Afterward, the UE waits until the A/D MAC CE instructing to activate the SCell. If the A/D MAC CE instructing to activate the corresponding SCell is received at subframe (n), the UE determines whether the TA timer of the TAG to which the SCell belongs is running at step 1050. If the timer is running, the UE activates both the downlink and uplink of the SCell at subframe (n+m1) at step 1055. If the TA timer of the TAG of the corresponding SCell is not running, the UE activates only the downlink at subframe (n+m1) at step 1060. The UE waits until a command instructing to perform random access through a certain SCell belonging to the TAG of the SCell. If the command is received, the UE transmits a preamble through the indicated SCell and waits until a valid random access response message is received at step 1065.

Figure 11:
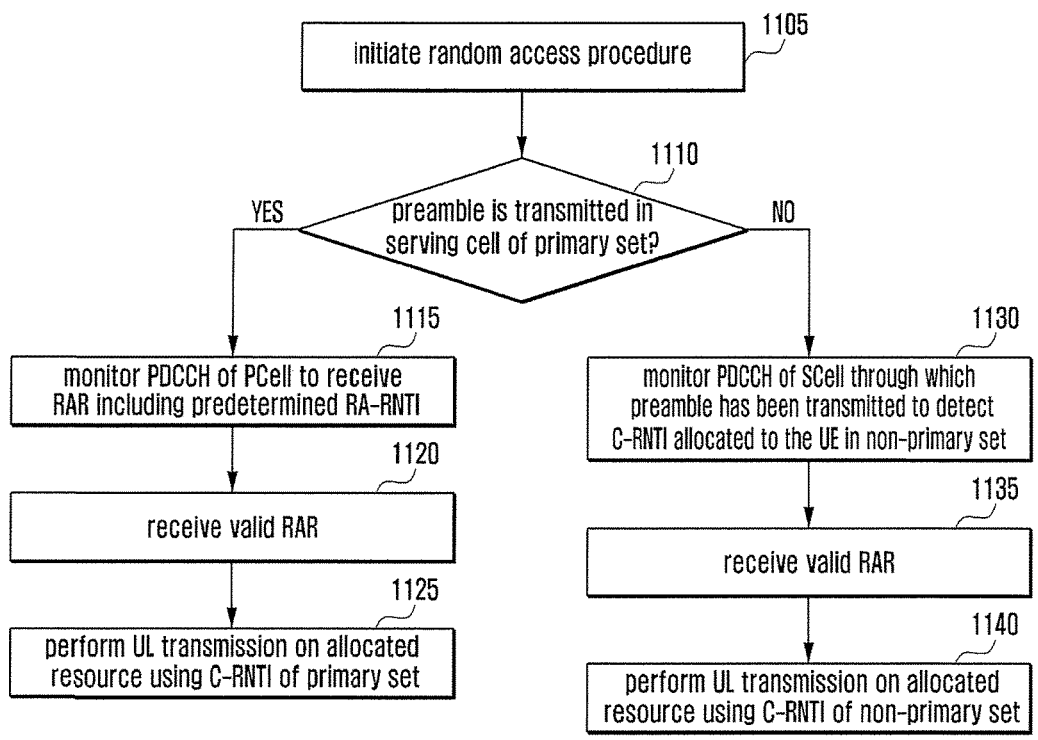
FIG. 11 is a flowchart illustrating the UE operation of performing random access.

FIG. 11 is a flowchart illustrating the UE operation of performing random access.

If the random access is initiated at step 1105, the UE transmits a preamble in a predetermined serving cell and the procedure goes to step 1110. At step 1110, the UE determines whether the cell in which the preamble has been transmitted belongs to the primary set or a non-primary set. If the serving cell belongs to the primary set, the procedure goes to step 1115 and, otherwise, step 1130. At step 1115, the UE monitors the PDCCH of the PCell to receive RAR including a predetermined RA-RNTI. The RA-RNTI is the identifier mapped to the resource on which the preamble has been transmitted. If a valid response message is received at step 1120. The procedure goes to step 1125. The valid response message means the MAC control message addressed to (or scrambled with) the RA-RNTI corresponding to the resource on which the UE has transmitted the preamble and, particularly, the mace control message has to include the preamble identifier corresponding to the preamble transmitted by the UE. The response message includes the TA command which the UE has to apply to the corresponding TAG and uplink transmission resource information for use in uplink transmission. The UE performs uplink transmission using the uplink transmission timing to which the TA command has been applied and the allocated uplink transmission resource at step 1125. At this time, the uplink transmission signal is scramble with the C-RNTI of the primary set. If the preamble has been transmitted the PCell, the uplink transmission is performed in the cell through which the RAR has been received and, otherwise if the preamble has been transmitted in an SCell, the uplink transmission is performed in the cell through which the preamble has been transmitted. If the preamble has been transmitted in a SCell of a non-primary set, the UE monitors the PDCCH of the SCell through which the preamble has been transmitted to detect the C-RNTI allocated to the UE for the non-primary set (C-RNTI_non_primary) at step 1130. If the UE receives a valid response message at step 1135, the procedure goes to step 1140. The valid response message means the MAC control message addressed to (or scrambled with) the C-RNTI_non_primary and, particularly, the MAC control message includes the TA command which the UE has to apply to the corresponding TAG and the uplink transmission resource allocation information. The UE performs uplink transmission in the corresponding SCell using the uplink transmission timing acquired by applying the TA command and the allocated uplink transmission resource at step 1140. At this time, the uplink transmission signal is scrambled with the C-RNTI_non_primary.

Figure 12:
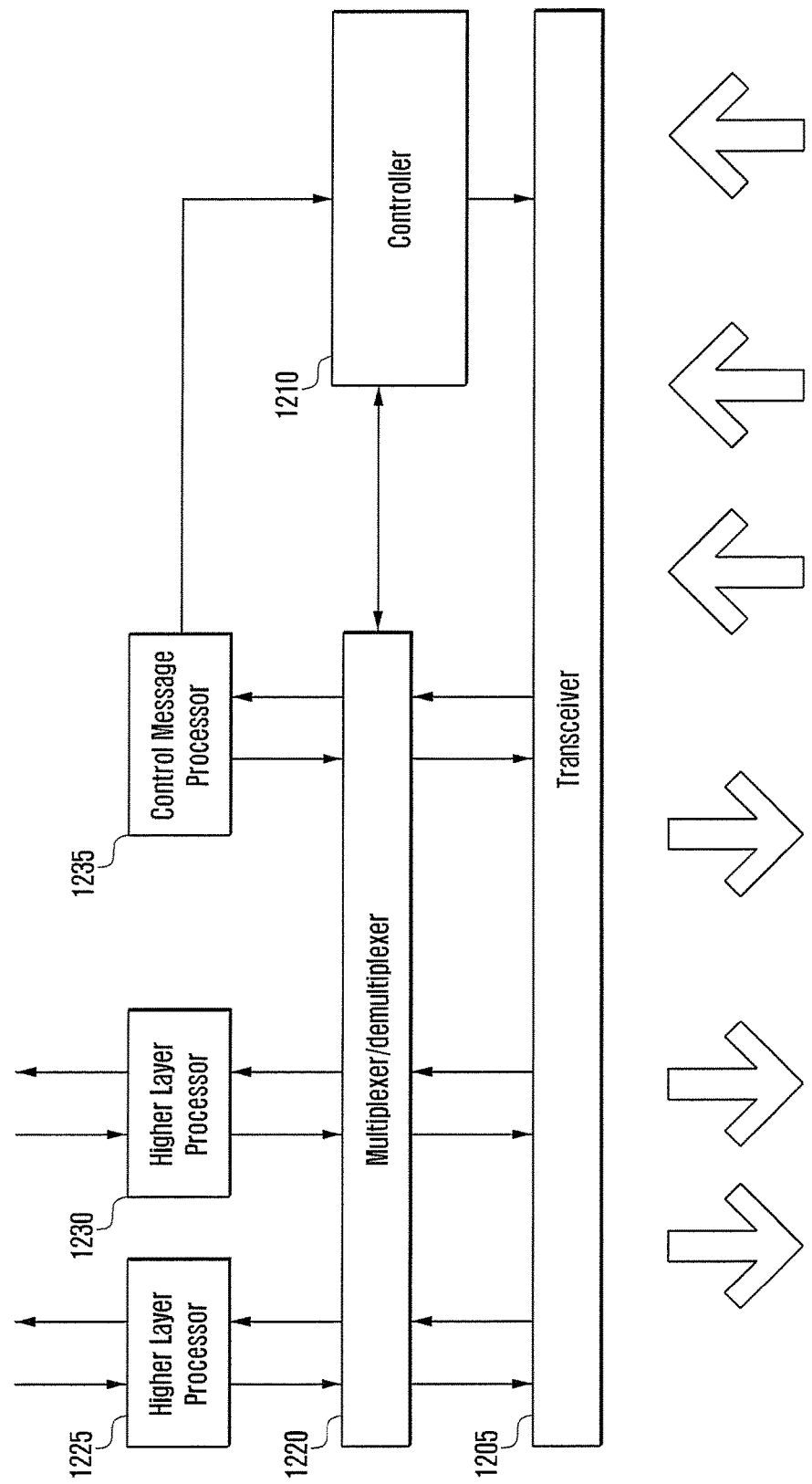
FIG. 12 is a block diagram illustrating a UE.

FIG. 12 is a block diagram illustrating a configuration of the UE according to an embodiment of the present invention.

Referring to FIG. 12, the UE according to an embodiment of the present invention includes a transceiver 1205, a controller 1210, a multiplexer/demultiplexer 1220, a control message processor 1235, and various higher layer processors 1225 and 1230.

The transceiver 1205 receives data and predetermined control signals on the downlink channel of the serving cell and transmits data and predetermined control signals on the uplink channel. In the case that a plurality of serving cells is configured, the transceiver 1205 transmits/receives data and control signals through the plural serving cells.

The multiplexer/demultiplexer 1220 multiplexes the data generated by the higher layer processors 1225 and 1230 and the control message processor 1235 and demultiplexes the data received by the transceiver 1205, the demultiplexed data being delivered to the higher layer processors 1225 and 1230 or the control message processor 1235.

The control message processor 1235 is an RRC layer entity which takes an action necessary for processing the control message received from the eNB. For example, the control message processor 1235 processes the received random access-related information and delivers the processing result to the controller.

The higher layer processors 1225 and 1230 are established per service. The higher layer processor processes the data generated by the user service such as File Transfer Protocol (FTP) and Voice over Internet Protocol (VoIP), the processing result being delivered to the multiplexer/demultiplexer 1220, and processes the data from the multiplexer/demultiplexer 1215, the processing result being delivered to the higher layer service application.

The controller 1210 controls the transceiver 1205 and the multiplexer/demultiplexer 1215 to check the scheduling command, e.g. uplink grants, received by the transceiver 1205 and perform uplink transmission using appropriate transmission resource at appropriate timing. The controller controls overall operations of SCell configuration and activation/deactivation.

In more detail, the controller 1210 receives secondary serving cell configuration information for use in configuring the secondary serving cell (SCell) from an eNB and determines whether the secondary serving cell belongs to the primary set or a non-primary set. The controller 1210 controls such that the initial downlink and uplink states of the serving cell to be set to active or inactive state depending on the determination result.

In more detail, if the secondary serving cell belongs to a non-primary set, the controller 1210 controls to acquire the system frame number of the secondary serving cell. The controller 1210 determines whether the secondary serving cell is of transmitting Physical Uplink Control Channel (PUCCH) and, if so, configures PUCCH to the secondary serving cell and sets the downlink initial state of the secondary serving cell to active state and the uplink initial state to inactive state.

The controller 1210 also sends the eNB a random access preamble and, if the random access response message is received in reply to the random access preamble, controls to set the uplink initial state to active state at a predetermined time point.

Otherwise if the secondary serving cell belongs to the primary set, the controller 1210 controls to sets the initial downlink and uplink states of the secondary serving cell to inactive state. If a control message for activating the secondary serving cell, the controller 1210 determines whether the timing advance timer of the timing advance group including the secondary serving cell is running and, if so, controls to set the initial downlink and uplink states of the secondary serving cell to active state at predetermined timing.

If the timing advance timer is not running, the controller 1210 controls to set only the downlink initial state of the secondary serving cell to active state at predetermined timing.

Figure 13:
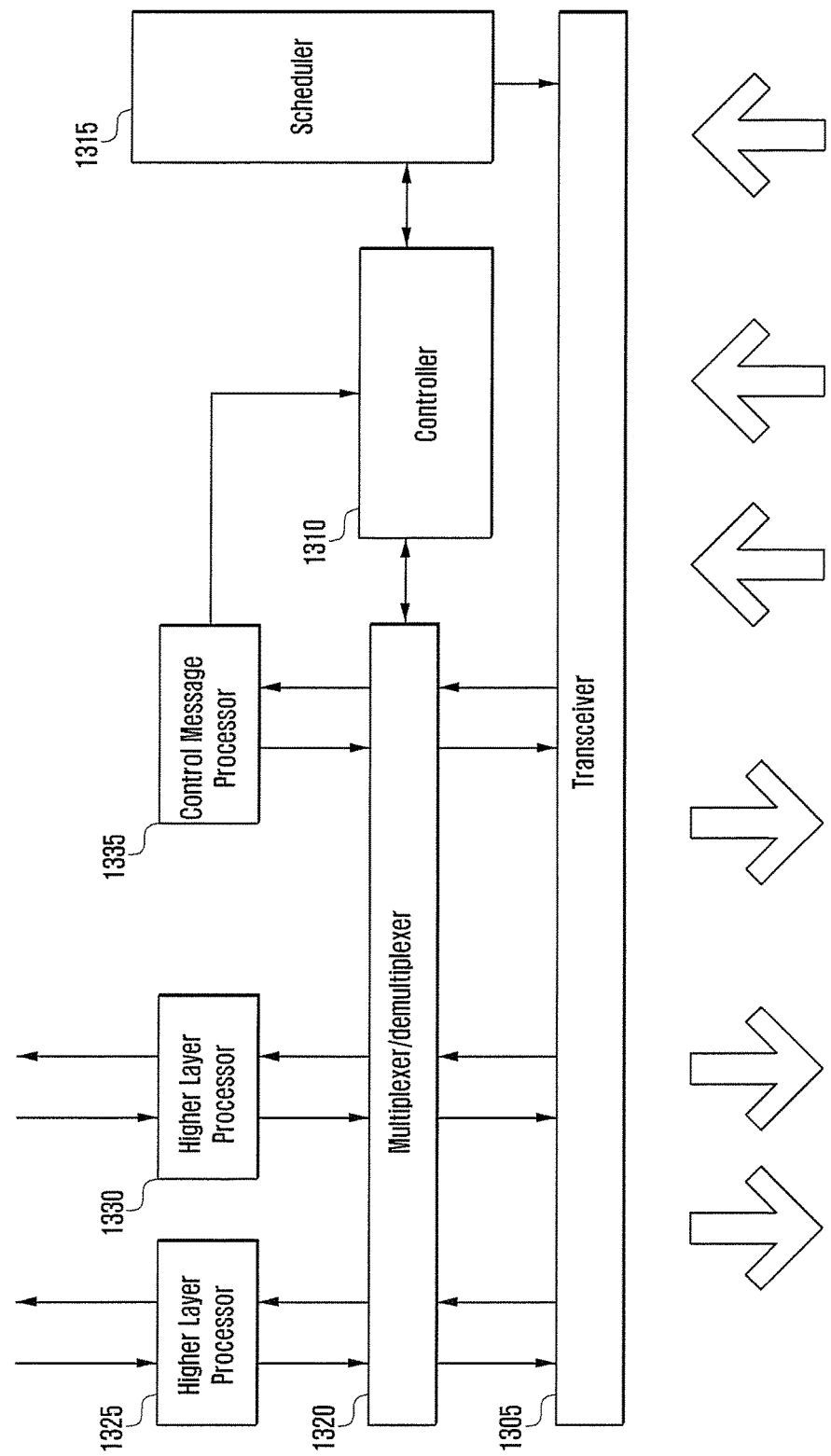
FIG. 13 is a block diagram illustrating an eNB.

FIG. 13 is a block diagram illustrating a configuration of the eNB according to an embodiment of the present invention, and the eNB includes a transceiver 1305, a controller 1310, a multiplexer/demultiplexer 1320, a control message processor 1335, various higher layer processors 1325 and 1330, and a scheduler 1315.

The transceiver transmits data and predetermined control signals on the downlink channel of the serving cell and receives data and predetermined control signals on the uplink channel. In the case that a plurality of carriers is configured, the transceiver 1305 transmits/receives data and control signals through the plural carriers.

The multiplexer/demultiplexer 1320 is responsible for multiplexing data generated by the higher layer processors 1325 and 1330 and the control message processor 1335 or demultiplexing the data received by the transceiver 1305, the demultiplexed data being delivered to the control message processor 1335 or the controller 1310. The control message processor 1335 processes the control message transmitted by the UE and takes a necessary action or generates a control message to be transmitted to the UE, the generated control message being delivered to the lower layer.

The higher layer processors 1325 and 1330 are established per service and processes the data from the S-GW or other eNB into RLC PDU, the RLC PDU being delivered to the multiplexer/demultiplexer 1320, and processes the RLC PDU from the multiplexer/demultiplexer 1320 into PDCP SDU, the PDCP SDU being transmitted to the S-GW or other eNB.

The scheduler allocates transmission resource to the UE at an appropriate timing in consideration of the UE buffer status and channel status and controls the transceiver to process the signal to be transmitted to the UE and transmit the signal.

The EPS bearer entity is established per EPS bearer, processes the data from the upper layer processor, and transfers the processed data to a next network node.

The invention claimed is:

1. A method of a terminal in a mobile communication system, the method comprising:
receiving a message including configuration information for configuring a secondary cell from a base station;
determining whether the secondary cell belongs to a first cell group including a primary cell (PCell) or a second cell group including a primary secondary cell (PSCell) for which a physical uplink control channel (PUCCH) is configured;
determining, based on the secondary cell belonging to the second cell group, whether the secondary cell is the PSCell;
transmitting, based on the secondary cell being the PSCell, a signal by considering an initial state of the secondary cell to be in an activated state in case that a timer associated with a timing advance group to which the secondary cell belongs is running;
prohibiting, based on the secondary cell not being the PSCell, a transmission of the signal by considering the initial state of the secondary cell to be in a deactivated state; and
receiving a medium access control (MAC) control element (CE) based on activating the secondary cell that is not the PSCell for the transmission of the signal.

2. The method of claim 1, wherein determining whether the secondary cell is the PSCell comprises acquiring, based on the secondary cell belonging to the second cell group, system frame number information for the secondary cell.

3. The method of claim 1, wherein transmitting the signal comprises:
transmitting a random access preamble to the base station; and
transmitting, based on a random access response message being received in response to the random access preamble, the signal by considering an uplink state to be in the activated state at a predetermined timing.

4. The method of claim 1, wherein determining whether the secondary cell belongs to the first cell group or the second cell group comprises prohibiting, based on the secondary cell belonging to the first cell group, the transmission of the signal by considering a state of the secondary cell to be in the deactivated state.

5. The method of claim 4, further comprising:
determining, based on an activation control message for activating the secondary cell being received, whether the timer is running; and
transmitting, based on the timer being running, the signal by considering the state of the secondary cell to be in the activated state.

6. The method of claim 5, wherein transmitting the signal comprises considering, based on the timer not running, a downlink state of the secondary cell to be in the activated state at a predetermined timing.

7. A terminal in a mobile communication system, the terminal comprising:
a transceiver; and
a controller configured to:
receive a message including configuration information for configuring a secondary cell from a base station,
determine whether the secondary cell belongs to a first cell group including a primary cell (PCell) or a second cell group including a primary secondary cell (PSCell) for which a physical uplink control channel (PUCCH) is configured,
determine, based on the secondary cell belonging to the second cell group, whether the secondary cell is the PSCell,
transmit, based on the secondary cell being the PSCell, a signal by considering an initial state of the secondary cell to be in an activated state in case that a timer associated with a timing advance group to which the secondary cell belongs is running,
prohibit, based on the secondary cell not being the PSCell, a transmission of the signal by considering the initial state of the secondary cell to be in a deactivated state, and
receive a medium access control (MAC) control element (CE) based on activating the secondary cell that is not the PSCell for the transmission of the signal.

8. The terminal of claim 7, wherein the controller is configured to acquire, based on the secondary cell belonging to the second cell group, system frame number information for the secondary cell.

9. The terminal of claim 7, wherein the controller is configured to:
transmit a random access preamble to the base station; and
transmit, based on a random access response message being received in response to the random access preamble, the signal by considering an uplink state to be in the activated state at a predetermined timing.

10. The terminal of claim 9, wherein the controller is configured to prohibit, based on the secondary cell belonging to the first cell group, the transmission of the signal by considering a state of the secondary cell to be in the deactivated state.

11. The terminal of claim 10, wherein the controller is configured to:
determine, based on an activation control message for activating the secondary cell being received, whether the timer is running; and
transmit, based on the timer being running, the signal by considering the state of the secondary cell to be in the activated state.

12. The terminal of claim 11, wherein the controller is configured to consider, based on the timer not running, a downlink state of the secondary cell to be in the activated state at a predetermined timing.

* * * * *